United States Patent
Bruckmeyer et al.

(10) Patent No.: US 8,385,334 B2
(45) Date of Patent: Feb. 26, 2013

(54) COMMUNICATION VIA ADDRESS MODULATION

(75) Inventors: Joshua Paul Bruckmeyer, West Melbourne, FL (US); William Walton Boesch, West Melbourne, FL (US); Stephen Joseph Tomko, Palm Bay, FL (US); Jason Zimmermann, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 370 days.

(21) Appl. No.: 12/757,642

(22) Filed: Apr. 9, 2010

(65) Prior Publication Data

US 2011/0249191 A1    Oct. 13, 2011

(51) Int. Cl.
*H04L 12/56* (2006.01)
(52) U.S. Cl. ........................ 370/389; 370/475
(58) Field of Classification Search .................. 370/389, 370/392, 475
See application file for complete search history.

(56) References Cited

U.S. PATENT DOCUMENTS

| | | | |
|---|---|---|---|
| 7,646,828 B2 | 1/2010 | Song et al. | |
| 2001/0037391 A1* | 11/2001 | West et al. | 709/226 |
| 2007/0207727 A1 | 9/2007 | Song et al. | |
| 2009/0323823 A1* | 12/2009 | Limberg | 375/240.25 |
| 2010/0037120 A1 | 2/2010 | Limberg | |

* cited by examiner

*Primary Examiner* — Pao Sinkantarakorn
(74) *Attorney, Agent, or Firm* — Tarolli, Sundheim, Covell & Tummino LLP

(57) ABSTRACT

Systems and methods are provided for communication via address modulation on an communication channel. A first processing component is configured to produce a plurality of data packets. Each data packet has an associated address from a plurality of available addresses. The system further comprises a plurality of addressable entities, with each of the addressable entities being represented by a proper subset of at least two of the available addresses. A second processing component is configured to apply at least one conditioning process to the series of data packets. The first processing component is configured to select an address for each packet from the subset of available addresses representing the addressable entity associated with the packet as to communicate data between the first processing component and the second processing component.

20 Claims, 3 Drawing Sheets

COMMUNICATION VIA ADDRESS MODULATION

FIELD OF INVENTION

The present invention relates to a communications system and, more particularly, to a communications system utilizing address modulation.

BACKGROUND OF THE INVENTION

The Advanced Television Systems. Committee (ATSC) published a Digital Television Standard in 1995 as Document A/53, hereinafter referred to simply as "A/53" for sake of brevity. A/53 describes vestigial-sideband amplitude modulation of the radio-frequency carrier wave using an eight-level modulating signal, which type of over-the-air DTV broadcasting is called "8-VSB". Efforts have been made to provide for more robust transmission of data over broadcast DTV channels without unduly disrupting the operation of so-called "legacy" DTV receivers already in the field. Robust transmission of data for reception by mobile and hand-held receivers is provided for in a Candidate Standard: ATSC Mobile DTV Standard published in June 2009, referred to hereinafter simply as "A/153" for sake of brevity, and incorporated herein by reference. A/153 is directed to transmitting ancillary signals in a time division multiplexing arrangement with 8-VSB DTV signals, which ancillary signals are designed for reception by mobile receivers and by hand-held receivers. The ancillary data employ internet protocol (IP) transport streams.

SUMMARY OF THE INVENTION

In accordance with an aspect of the present invention, a communications system is provided. A first processing component is configured to produce a plurality of data packets. Each data packet has an associated address from a plurality of available addresses. The system further comprises a plurality of addressable entities, with each of the addressable entities being represented by a proper subset of at least two of the available addresses. A second processing component is configured to apply at least one conditioning process to the series of data packets. The first processing component is configured to select an address for each packet from the subset of available addresses representing the addressable entity associated with the packet as to communicate data between the first processing component and the second processing component.

In accordance with another aspect of the present invention, a method is provided for establishing a side communication channel between first and second entities in a communications system. A first data stream, representing a content of a main communication channel, and a second data stream, representing the side channel, are provided at a first processing component. The first data stream is encoded as a series of packets, with each packet having an associated addressable entity. An address is selected for each packet from a plurality of addresses associated with its associated addressable entity as to encode at least one bit of data from the second data stream. The second data stream is decoded from the selected addresses at a second processing system. At least one data conditioning process is performed on the first data stream according to the decoded second data stream.

In accordance with yet another aspect of the present invention, a post-processing system for a digital television system is configured to process a series of data packets according to an address modulated side channel generated through selection of an address for each packet from a subset of available addresses representing an addressable destination of the packet. A data randomizer is configured to be responsive to the address modulated side channel as to determine if a given packet in the series of data packets contains main service data or handheld/mobile data, such that packets containing main service data are randomized and packets containing handheld/mobile data are not randomized. At least one Trellis coder is configured to perform one of an initialization process and a training process in response to the decoded second data stream.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF EXAMPLE EMBODIMENTS

Figure 1:
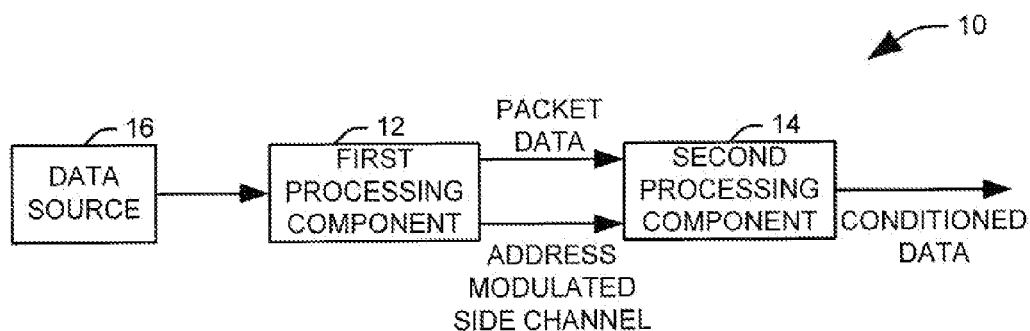
FIG. 1 illustrates a communications system configured to transmit addressable packets between a first processing component and a second processing component in accordance with an aspect of the present invention.

FIG. 1 illustrates a communications system 10 configured to transmit addressable packets between a first processing component 12 and a second processing component 14 in accordance with an aspect of the present invention. Data is provided to the first processing component 12 from a data source 16. The first processing component 12 is configured to encapsulate the provided data into packets, with each packet having an address associated with an addressable entity. For example, an addressable entity can include an entity on an IP (Internet Protocol) network or similar arrangement. Alternatively, an addressable entity can comprise a particular file designation at a destination (e.g., different audio and video channels in a real-time video application).

In the illustrated system, each of the addressable entities can be represented by at least two addressed, such that the first processing component 12 can select among of the at least two addresses for each packet without altering the entity to which the packet is addressed. For example, one Internet Protocol (IP) address could map to two available IP addresses for communication over a channel. In accordance with an aspect of the present invention, the first processing component 12 can be configured to select among the at least two addresses for a given packet as to transmit at least one bit of data. Accordingly, the address selection at the first processing component 12 is used to provide a side communication channel encoded within the addresses of the packet data.

The packet data, along with the encoded side communication channel, are then transmitted to a second processing component 14. The second processing component 14 is configured to provide at least one conditioning process to the data to provide conditioned data suitable for transmission to the addressable entities. For example, in the case of the plurality of IP addresses used for a side-channel, this side-channel information could be used for feed-forward network configuration such as enabling and disabling ports on a network switch. For example, the second processing component can provide one or more of a data randomization, error coding (e.g., Reed-Solomon or Trellis coding), synchronization, and similar processes.

In accordance with an aspect of the present invention, data from the side communication channel can be decoded at the second processing component 14 and utilized in the at least conditioning process, such that the at least one conditioning process is responsive to the side channel data. For example, the side channel can identify one or more characteristics of the data encapsulated in the packets to allow the second processing component 14 to select or configure a data conditioning process. It will be appreciate that, through modulating the side communication channel into the packet addresses, the portion of the data channel reserved for overhead can be reduced.

Figure 2:
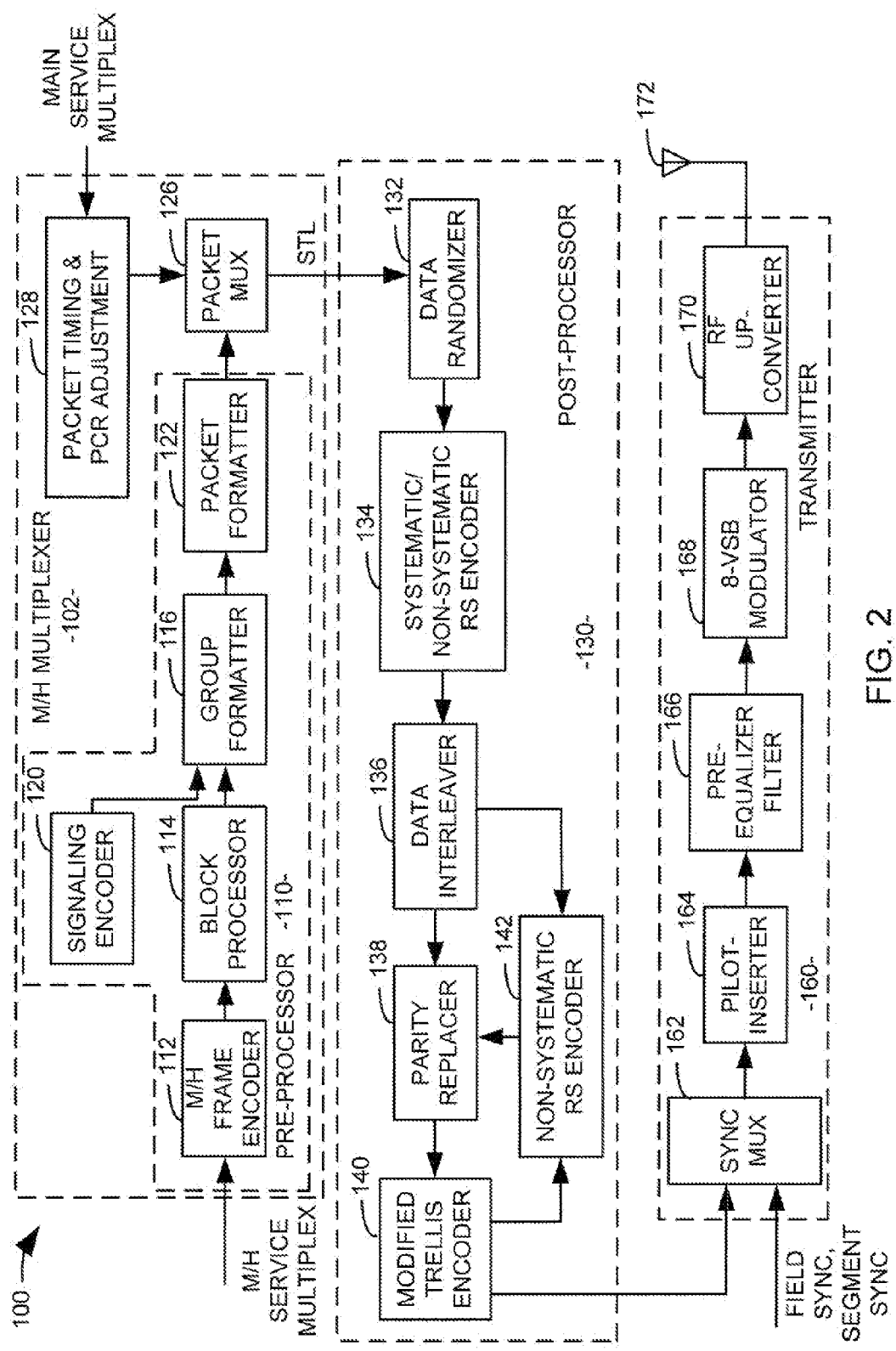
FIG. 2 illustrates an exemplary system for broadcasting digital television signals in accordance with an aspect of the present invention.

FIG. 2 illustrates an exemplary system 100 for broadcasting digital television (DTV) signals in accordance with an aspect of the present invention. A mobile/handheld (M/H) multiplexing system 102 receives two sets of input streams, one composed of the MPEG transport stream (MPEG-TS) packets of the main-service data and the other composed of M/H service data. The M/H service data are encapsulated in packets at a pre-processor 110 before transmission, referred to hereinafter as "MHE packets". The pre-processing system 110 combines the MPEG-TS packets of the main-service data and the MHE packets of the M/H service data within one stream of transport packets. Then, a post-processing system 130 processes the combined stream for transmission as an ATSC, trellis-coded 8-VSB signal.

In the illustrated implementation, which is configured to selectively utilize the ATSC A/153 protocol, the post-processing system 130 requires information about the content of the combined signal in order to perform its functions. For example, various components need data to select between A/53 and A/153 processing on each packet.

A mobile/handheld (M/H) service multiplex stream of data is supplied to a pre-processor 110 for processing and subsequent encapsulation in the payload fields of transport packets, referred to hereinafter as "MHE packets". To this end, the M/H service multiplex stream of data is supplied to an M/H frame encoder 112, which provides Reed-Solomon (RS) coding of data packets. The data packets are further subjected to periodic cyclic-redundancy-check (CRC) coding to locate byte errors for the RS coding. Each M/H frame is composed of one or two frames of the RS coding, and the data in each frame of the RS-CRC coding are randomized independently from each other and from the data of the main-service multiplex.

The M/H frame encoder 112 provides M/H frames to a block processor 114 that provides convolutional coding to the M/H frames. A group formatter 116 maps the forward error corrected M/H-service data from the block processor 114 into the corresponding M/H blocks of an M/H Group, adding pre-determined training data bytes and data bytes to be used for initializing the trellis encoder memories, and inserts 3-byte headers for the MHE packets. The group formatter 116 also inserts placeholder bytes for main-service data and for non-systematic lateral Reed-Solomon parity. In the illustrated implementation, the group formatter 116 assembles a succession of 118 consecutive transport stream packets, with some of these TS packets are composed of the interleaved convolutional coding supplied by the block processor 114, some of these transport stream packets being prescribed training signals stored in read-only memory and inserted at prescribed intervals within each M/H Group, and others being generated by a signaling encoder 120.

The output of the group formatter 116 is provided to a packet formatter 122. The packet formatter 122 is configured to remove the main service data place holders and the RS parity place holders that were inserted by the group formatter 116 and replace them with an MPEG header having a packet identifier PID. In accordance with an aspect of the present invention, the packet formatter 122 can be configured to select a packet identifier (PID) for each MHE packet as to provide a transmitter control channel (TCC) to the post-processing system 130. For example, the post processor 130 needs to be provided with the group formatter bit locations, which, in the illustrated implementation, are a function of group map.

The post-processing system 130 requires, at a minimum, two pieces of information to perform its functions; specifically whether a MPEG-TS packet contains M/H pre-processed data and the relationship of that packet to the start of an M/H slot. In a first mode of operation, referred to herein as the "TCC standard mode," the relationship to the start of an M/H slot can be accomplished using known alignment methods such as a cadence signal, provided via inversion of appropriate synchronization and Distributed Transmission Packet (DTxP) methods, such as those provided in the A/110 standard. In the illustrated system, the transmitter control channel can carry the remaining information, as well as other information deemed necessary.

In an M/H system, slots, which contain M/H data, have 118 contiguous MPEG-TS packets that contain M/H pre-processed data followed by 38 contiguous legacy or main MPEG-TS. In accordance with an aspect of the present invention, one or more private MHE packet PIDs can be defined for each of a plurality of addressable entities in the system to allow these 118 contiguous M/H packets to communicate the full M/H slot group map. With two MHE packet PIDs, it is possible to communicate the complete group map definition, with space remaining to communicate additional studio-transmitter link (STL) information such as VSB frame alignment.

In accordance with an aspect of the present invention, the transmitter control channel communicates in TCC packets, where a TCC packet contains 156 TCC words. The first TCC word shall be aligned to the first MPEG-TS in an M/H slot, which in-turn is aligned to a VSB frame. TCC packets are transmitted in every active M/H slot, where as TCC Null Packet shall be transmitted every non M/H slot. The first 118 TCC words in the TCC packet provide a TCC payload, where the remainder of the words shall carry the TCC null word. A sequence of at least fifty TCC null words is used at the end of an M/H slot as a delimiter between TCC packets, and can be used to determine the start of a TCC packet, as to provide VSB frame alignment. The TCC null packet is a TCC packet where each of the 156 TCC words is the TCC null word.

Each TCC message word shall be composed of two hits, a first, MH_present, bit that defines whether the packet contains M/H data and a second, payload bit that carries the TCC payload if the packet contains M/H data. In the illustrated implementation, the private PIDs used to carry the transmitter control channel are defined by the two least significant bits of the private PID range, and the TCC null word can be defined by setting both of the bits to zero.

TABLE 1

TCC Payload Structure for Standard Mode

| Field | No. of Bits | Format |
|---|---|---|
| tcc_mode | 2 | '11' |
| Reserved | 1 | '1' |
| tcc_protocol_version | 5 | uimsbf |
| rs_frame_mode | 2 | bslbf |
| future_mode | 3 | bslbf |
| Reserved | 3 | '111' |
| subframe_number | 3 | bslbf |
| slot_number | 4 | uimsbf |
| Reserved | 1 | '1' |
| mh_gps_seconds | 24 | uimsbf |
| If (Optional a/110b | | |
| reserved | 5 | '00000' |
| tx_identifier_level | 3 | uimsbf |
| | 12 | uimsbf |
| tx_address | 12 | uimsbf |
| } | | |
| else { | | |
| reserved | 32 | for (i=0, i<27, |
| } | | |
| reserved | 18 | for (i=0, i<23, |
| crc_8 | 8 | uimsbf |

Table 1 illustrates the structure of the payload a TCC packet when the system 100 is operating in TCC standard mode. A tcc_mode field uses two bits to specify a TCC mode of operation. A first value "11" indicates that the TCC standard mode is being used, while a second value "00" indicates the use of a TCC extended mode, which will be discussed in detail below. A tcc_protocol_version field is a five-bit unsigned integer field representing the version of the structure of the TCC data structure syntax. The two most-significant bits are the major version level and the least-significant three bits are the minor version level. In practice, a change in the major version level shall indicate a non-backwards-compatible level of change, while a change in the minor version level, provided the major version level remains the same, shall indicate a backwards-compatible level of change. For a system as described herein, the value of this field is set to '11111', if the system utilizes the minor protocol versioning mechanism option.

An rs_frame_mode field identifies the RS Frame mode of the set of Parade(s) sharing identical parade_id, which a given M/H Group belongs to, for the current M/H Frame. A subframe_number field is a three-bit field that identifies the current M/H subframe, with valid values between zero and four, inclusive. A slot_number field is a four-bit field identifying the current M/H slot within the current subframe, with valid values between 0 and 15, inclusive. A mh_gps_seconds field is a twenty-four bit unsigned integer field that indicates the elapsed time, measured in 100 ns increments, between a 1-second tick of the GPS clock and the first bit of the MPEG-2 packet sync byte in the header of the first MPEG-TS packet of the TCC packet. This allows the relationship between the one PPMF and one PPS can be distributed across the studio-transmitter link. A crc_8 field provides an unsigned eight-bit integer representing an eight-bit cyclic redundancy check with $X_8+X_7+X_6+X_4+X_2+1$ as polynomial which is computed over the first 13 bytes of the TCC payload.

In some implementations, such as multiple frequency networks, functionality compatible with the ATSC a/110b standard may be desirable. In this case, three additional fields can be added. A network_identifier_pattern field, consistent with ATSC A/110b, is a twelve-bit unsigned integer field representing the network in which the transmitter is located that provides the seed value for twelve of the twenty four bits used to set the symbol sequence of a unique code assigned to each transmitter. All transmitters within a network use the same twelve-bit pattern. A tx_address field is a twelve-bit unsigned integer field that carries the address of the transmitter to which the following fields are relevant and which is used to seed a portion of a RF watermark code sequence generator. A tx_identifier_level provides a three-bit unsigned integer field that indicates to which of eight levels (including off) the RF watermark signal of each transmitter shall be set.

In accordance with an aspect of the present invention, additional private PIDs can be used to increase the effective bandwidth of the private communication channel. When the system is operating in this mode, referred to as the TCC extended mode, the communication channel can provide addition data, such as an ATSC Time transmitter control packet. The extended TCC is based on the normal rules and constructs of the standard TCC channel, as described previously, except for the use of an extended TCC word length of three bits, requiring four private PIDs instead of the standard two. This expands the TCC payload from 106 bits to 212 bits. In TCC extended mode, a first, MH_present, bit that defines whether the packet contains M/H data and second and third bits that carry the TCC payload if the packet contains M/H data. In the illustrated implementation, the private PIDs used to carry the transmitter control channel are defined by the three least significant bits of the private PID range, and the TCC null word can be defined by setting all three of the bits to zero. In extended mode, the end of the M/H slot is indicated by a sequence of at least one hundred consecutive null words.

TABLE 2

TCC Payload Structure for Extended Mode

| Syntax | Bits | Format |
|---|---|---|
| tcc_mode | 2 | '00' |
| Reserved | 1 | '1' |
| tcc_protocol_version | 5 | uimsbf |
| rs_frame_mode | 2 | bslbf |
| future_mode | 3 | bslbf |
| Reserved | 3 | '111' |
| subframe_number | 3 | bslbf |
| slot_number | 4 | uimsbf |
| Reserved | 1 | '1' |
| mh_gps_seconds | 24 | uimsbf |
| network_identifier_pattern | 12 | uimsbf |
| tx_tier | 4 | uimsbf |
| tx_data_inhibit | 1 | bslbf |
| tx_update_timing | 1 | uimsbf |
| for (i=0; i<12; i++) { | | |
| trellis_code_state | 3 | uimsbf |
| } | | |
| Reserved | 2 | '11' |
| synchronization_time_stamp_extension | 1 | bslbf |
| tx_identifier_level | 3 | uimsbf |
| tx_power | 12 | uipfmsbf |
| Reserved | 1 | '1' |
| synchronization_time_stamp | 24 | uimsbf |
| maximum_delay | 24 | uimsbf |
| tx_address | 12 | uimsbf |
| tx_time_offset | 16 | tcimsbf |
| Reserved | 1 | '1' |
| maximum_delay_extension | 1 | bslbf |
| crc_8 | 8 | |

Mode

Table 2 illustrates the bit stream syntax for the TCC extended payload structure. The syntax of the original DTxP packet was modified for both size constraints and to signal in an extended TCC model. In the TCC extended mode, a tx_tier field was added to replace the original OM_type field and the trellis_code_state field was modified to remove the redundancy constructs in the DTxP packet. The tx_tier field is a four-bit unsigned integer field that defines the addressed tiers in sequence proceeding away from the source end of the network, starting with 00 for the tier closest to the source and incrementing by one for each successive tier in the cascade.

The tx_group size was changed from sixteen transmitters to one transmitter, with one transmitter signaled per active MPH slot and up to 80 transmitters can be signaled every MPH frame. The tx_group_number field was enlarged to support this change. Finally, in an a/110b system, the update rate is determined by the rate of the DTxP packets in the MPEG_TS. In the TCC extended mode, a transmitter could be sent a new 'DTxP' packet every MPH slot. It may be undesirable to update timing at such a rate, and thus a tx_update_timing field was added to allow signaling to the transmitter when timing should be updated, supported a slower update rate more typical of an a/110b system.

A synchronization_time_stamp field is a twenty-five bit unsigned integer field that indicates the elapsed time, measured in bit-time increments, between the ATSC Time (AT) tick and the first bit of the MPEG-2 packet sync byte in the header of the first MPEG-TS packet of the TCC packet. Bit-time increments are defined by the period of an a/53 Transport Rate (TR) bit, nominally 51.6 ns. The 25-bit number is the concatenation of the synchronization_time_stamp_extension field and the synchronization_time_stamp field.

A maximum_delay field is a twenty-five bit unsigned integer field that indicates the time delay setting in the system, measured in bit-time increments, between an AT tick and the first bit of the MPEG-2 packet sync byte in the header of the first MPEG-TS packet of the TCC packet. As with the synchronization fields, the bit-time increments is defined by the period of an a/53 Transport, Rate (TR) bit, nominally 51.6 ns. The 25-bit number is the concatenation of maximum_delay_extension and maximum_delay.

Each of twelve trellis_code_state fields provide 3-bit field carrying one copy of the three bits of the state of a precoder. A tx_update_timing field is a one-bit unsigned integer field that defined whether a transmitter should use the content of the Extended TCC payload to adjust emission timing. A '1' instructs the transmitter to adjust the timing, and a '0' instructs the transmitter to maintain current emission timing.

A tx_data_inhibit field is a one-bit field that indicates when the tx_data information should not be encoded into the RF watermark signal. A tx_time_offset field is a sixteen-bit signed integer field that indicates a time offset, measured in bit-time increments, between the reference time determined using the maximum_delay field and the time of emission of the individual transmitter to which it is addressed. As before, bit-time increments are defined by the period of an a/53 Transport Rate (TR) bit, nominally 51.6 ns. A tx_power field is a twelve-bit unsigned integer plus fraction that indicates the power level to which the transmitter to which it is addressed should be set. The most significant eight bits indicate the power in integer dB relative to zero dBm, and the least significant four bits indicate the power in fractions of a dB.

In addition to the MHE packets provided at the packet formatter 122, main service data is supplied to the packet multiplexer 126 through packet timing and program clock reference (PCR) adjustment circuitry 128. The packet timing and PCR adjustment circuitry 126 adjusts the timing of the main service packets to facilitate the multiplexing of the main service data with the MHE packets. The packet multiplexer 126 operates as a time division multiplexer to combine the main service packets with the MHE packets. The combined output of the multiplexer, including the address modulated transmitter control signal, is provided to a post-processing system 130 configured to process the main-service data by normal 8-VSB encoding and to re-arrange the pre-processed M/H-service data in the combined stream to ensure backward compatibility with ATSC 8-VSB.

The combined signal is provided to a data randomizer 132 that suppresses the sync bytes of the 188-byte TS packets and randomizes the main service data but not the encapsulated M/H-service data. In accordance with an aspect of the present invention, the data randomizer 132 can be responsive to the transmitter control channel, such that some packets are randomized while others are not. For example, the data randomizer can determine whether data is M/H service data or main service data as well as one or more other properties of the packets from the transmitter control channel and selectively randomize the data packets.

The output of the data randomizer 132 is provided to a systematic/non-systematic Reed-Solomon (RS) encoder 134. Like the data randomizer, the Reed-Solomon encoder is configured to be responsive to the data provided in the address modulated transmitter control channel. Specifically, the Reed-Solomon encoder 134 extracts from the side channel the type of data (i.e., main service or M/H), the parity byte locations within each M/H data packet, and any other relevant information. From this information, the systematic/non-systematic RS encoder 134, can either perform the systematic RS coding process prescribed in A/53, appending the twenty bytes of RS parity data to the conclusion of the 187-byte packet, or a non-systematic RS encoding process, placing the twenty bytes of RS parity data at a location defined within the transmitter control channel, according to the information received in the transmitter control channel.

The RS encoded data is provided to a data interleaver 136, configured to supply byte-interleaved 207-byte RS codewords via a parity replacer 138 to a trellis encoder 140. The trellis encoder 140 converts the interleaved data into symbol units and performs a twelve-phase trellis coding process. In order for the output data of the trellis encoder 140 to include pre-defined known training data, initialization of the memories in the trellis encoder is required.

This initialization can cause the Reed-Solomon parity data calculated by the systematic/non-systematic RS encoder 134 prior to the trellis initialization to be erroneous. The RS parity data must be replaced to ensure backward compatibility with legacy DTV receivers. Accordingly, a non-systematic Reed-Solomon coder 142 is provided to recalculate the RS parity of the affected M/H packets and provide this parity data to the RS parity replacer 138. The parity replacer substitutes the re-calculated RS parity bytes for the original RS parity bytes before they are supplied to the modified trellis encoder 140.

In accordance with an aspect of the present invention, each of the Trellis encoder 140, the non-systematic RS encoder 142, and the parity replacer 144 can be responsive to the transmitter control channel in performing their respective functions. For example, the transmitter control channel can instruct the Trellis coder 140 when it is necessary to perform the trellis initialization and training processes. Similarly, the non-systematic RS encoder 142 and the parity replacer 144 can be instructed if it is necessary to perform parity replacement as well as at what locations in the frame the parity replacement is necessary.

The trellis-coded signal is provided to a transmitter system 160 at a synchronization multiplexer 162. The synchronization multiplexer 162 receives the trellis-coded data generated by the trellis encoder 140 and at least synchronization signals comprising the data segment sync (DSS) and the data field sync (DFS) signals. The two synchronization signals are time-division multiplexed with the trellis-coded data and supplied to a pilot inserter 164. The pilot inserter 164 introduces a direct-component offset into the signal for the purpose of generating a pilot carrier wave during subsequent balanced modulation of a suppressed intermediate-frequency (IF) carrier wave.

The signal provided by the pilot inserter 164 is filtered at a pre-equalizer filter 166 and provided to an 8-VSB exciter 168. The 8-VSB exciter 168 supplies the suppressed IF carrier wave to a radio frequency (RF) up-converter 170 to be upconverted to a desired broadcast frequency. The RF up-converter 170 can include a high power amplifier configured to amplify the power of the radio frequency (RF) signal before transmitting the signal at a broadcast antenna 172.

Figure 3:
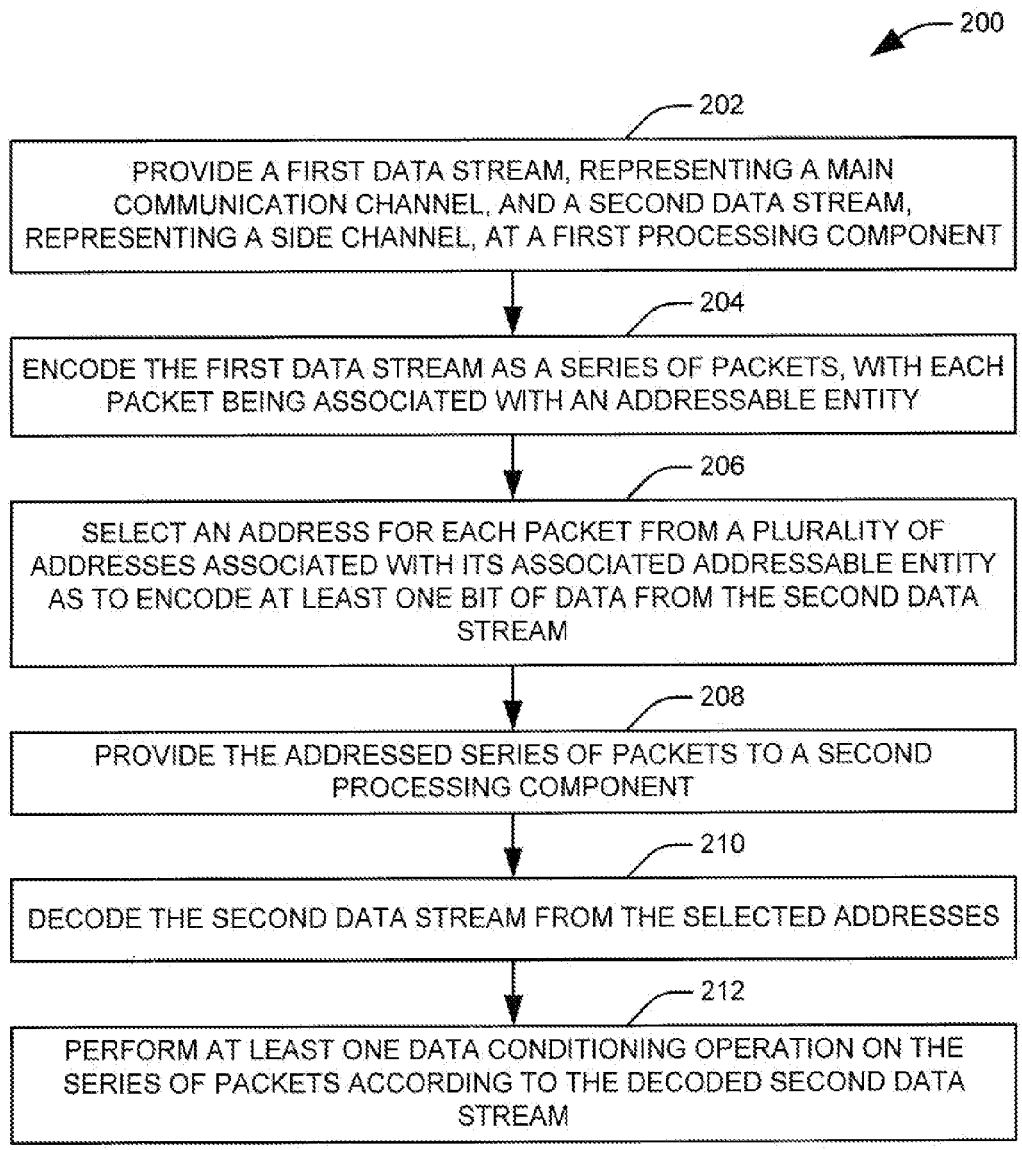
FIG. 3 illustrates a method for establishing a side communication channel between first and second entities in a communications system.

FIG. 3 illustrates a method 200 for establishing a side communication channel between first and second entities in a communications system in accordance with an aspect of the present invention. At 202, a first data stream, representing a content of a main communication channel, and a second data stream, representing the side channel, are provided at a first processing component. It will be appreciated that each of the first data stream and the second stream can be generated at the first processing component or generated externally and transmitted to the first processing component. In one implementation of the method 200, at least a portion of the second data stream is derived in response to one or more characteristics of the first data stream.

At 204, the first data stream is encoded as a series of packets, each packet having an associated addressable entity. In accordance with an aspect of the present invention, each addressable entity can have a plurality of associated packet addresses. At 206, an address is selected for each packet from a plurality of addresses associated with its associated addressable entity as to encode at least one bit of data from the second data stream. Essentially, the data from the second data stream are modulated on to the address data via the selection at 206, as to form a second data channel, representing the second data stream, within the series of packets representing the first data stream.

The series of packets is provided to a second processing component at 208, and at 210, the second data stream is decoded at the second processing component from the selected addresses. The second processing component can be configured to match each selected address to a word of data, and thus recover the contents of the second data stream. At 212, at least one data conditioning process is performed on the first data stream according to the decoded second data stream. In one implementation, the second data stream contains data describing one or more characteristics of the first data stream, and the at least one data conditioning process can be selected and configured according to this data.

Figure 4:
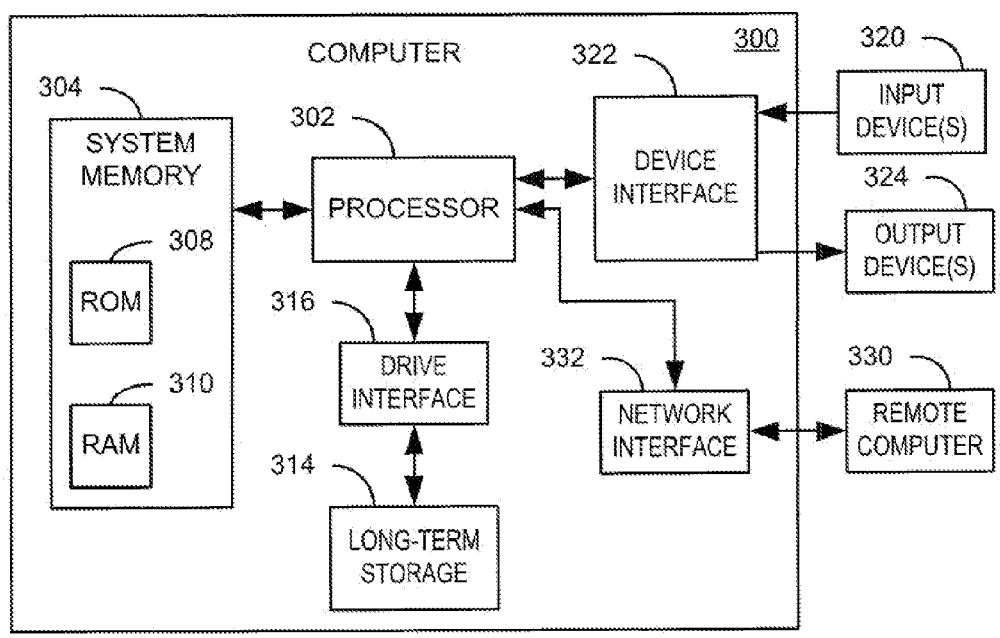
FIG. 4 illustrates a computer system that can be employed to implement all or portions of the systems and methods described herein, such as based on computer executable instructions running on the computer system.

FIG. 4 illustrates a computer system 300 that can be employed to implement systems and methods described herein, such as based on computer executable instructions running on the computer system. The computer system 300 can be implemented on one or more general purpose networked computer systems, embedded computer systems, routers, switches, server devices, client devices, various intermediate devices/nodes and/or stand alone computer systems. Additionally, the computer system 300 can be implemented as part of the computer-aided engineering (CAE) tool running computer executable instructions to perform a method as described herein.

The computer system 300 includes a processor 302 and a system memory 304. Dual microprocessors and other multi-processor architectures can also be utilized as the processor 302. The processor 302 and system memory 304 can be coupled by any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) can reside in the ROM 308, generally containing the basic routines that help to transfer information between elements within the computer system 300, such as a reset or power-up.

The computer system 300 can include one or more types of long-term data storage 314, including a hard disk drive, a magnetic disk drive, (e.g., to read from or write to a removable disk), and an optical disk drive, (e.g., for reading a CD-ROM or DVD disk or to read from or write to other optical media). The long-term data storage can be connected to the processor 302 by a drive interface 316. The long-term storage components 314 provide nonvolatile storage of data, data structures, and computer-executable instructions for the computer system 300. A number of program modules may also be stored in one or more of the drives as well as in the RAM 310, including an operating system, one or more application programs, other program modules, and program data.

A user may enter commands and information into the computer system 300 through one or more input devices 320, such as a keyboard or a pointing device (e.g., a mouse). These and other input devices are often connected to the processor 302 through a device interface 322. For example, the input devices can be connected to the system bus by one or more a parallel port, a serial port or a universal serial bus (USB). One or more output device(s) 324, such as a visual display device or printer, can also be connected to the processor 302 via the device interface 322.

The computer system 300 may operate in a networked environment using logical connections (e.g., a local area network (LAN) or wide area network (WAN) to one or more remote computers 330. A given remote computer 330 may be a workstation, a computer system, a router, a peer device or other common network node, and typically includes many or all of the elements described relative to the computer system 300. The computer system 300 can communicate with the remote computers 330 via a network interface 332, such as a wired or wireless network interface card or modem. In a networked environment, application programs and program data depicted relative to the computer system 300, or portions thereof, may be stored in memory associated with the remote computers 330.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A communication system comprising:
   a pre-processing system in a digital television system configured to produce a plurality of data packets, each data packet having an associated address from a plurality of available addresses;
   a plurality of addressable entities, each of the addressable entities being represented by a proper subset of at least two of the available addresses; and post-processing system in the digital television system configured to apply at least one conditioning process to the series of data packets;

wherein the pre-processing system is configured to select an address for each packet from the subset of available addresses representing the addressable entity associated with the packet as to communicate timing information between the pre-processing system and the post-processing system.

2. The system of claim 1, the pre-processing system being configured to select a first address for a packet from the subset of available addresses representing the addressable entity associated with the packet when the packet contains a first type of data and a second address for the packet when the packet contains a second type of data.

3. The system of claim 1, the post-processing system being configured to apply a first conditioning process to a given packet when the pre-processing system selects a first address and apply a second conditioning process to the packet when the pre-processing system selects a second address.

4. The system of claim 1, the pre-processing system comprising a packet formatter configured to select a first address for a packet from the subset of available addresses representing the addressable entity if the packet contains M/H pre-processed data.

5. The system of claim 4, the post-processing system comprising a data randomizer configured to be responsive to the address selected at the first processing component, such that packets having the first address is not randomized.

6. The system of claim 4, the post-processing system comprising a systematic/non-systematic Reed-Solomon encoder configured to be responsive to the address selected at the first processing component, such that packets having the first address are subjected to a non-systematic Reed-Solomon encoding process and other packets are subjected to a systematic Reed-Solomon encoding process.

7. A method for establishing a side communication channel between first and second entities in a communications system comprising:

providing a first data stream, representing a content of a main communication channel, and a second data stream, representing the side channel, at a first processing component;

encoding the first data stream as a series of packets, each packet having an associated addressable entity;

selecting an address for each packet from a plurality of addresses associated with its associated addressable entity as to encode at least one bit of data from the second data stream;

decoding the second data stream from the selected addresses at a second processing system; and performing at least one data conditioning process on the first data stream according to the decoded second data stream.

8. The method of claim 7, wherein the at least one data conditioning process comprises Trellis coding and performing the Trellis coding process on the first data stream according to the decoded second data stream comprises performing one of a Trellis initialization process and a training process in response to the decoded second data stream.

9. The method of claim 7, wherein performing the at least one data conditioning process comprises selectively performing a parity replacement on the first data stream according to the decoded second data stream.

10. The method of claim 7, wherein performing at least one data conditioning process comprises selectively providing one of systematic Reed-Solomon encoding or non-systematic Reed-Solomon encoding according to the decoded second data stream.

11. The method of claim 7, wherein selecting an address for each packet from a plurality of addresses associated with its associated addressable entity as to encode at least one bit of data from the second data stream comprises encoding timing data within the second data stream.

12. The method of claim 7, wherein providing a first data stream comprising providing a data stream comprising MPEG formatted video.

13. The method of claim 7, the second data stream comprising data for performing a cyclic redundancy check on the first data stream.

14. The method of claim 7, wherein providing a first data stream and a second data stream comprises deriving the second data stream from the first data stream.

15. The method of claim 7, further comprising transmitting the first data stream at an associated transmitter.

16. A system for utilizing a side communication channel between first and second entities comprising:

a data source configured to provide a first data stream, representing a content of a main communication channel;

a first processing component configured to encode the first data stream as a series of packets, with each packet having an associated addressable entity, and selecting an address for each packet from a plurality of addresses associated with its associated addressable entity as to encode at least one bit of data of a second data stream, representing the side communication channel; and a second processing component configured to decode the second data stream from the selected addresses and perform at least one data conditioning process on the first data stream according to the decoded second data stream.

17. The system of claim 16, the first processing component being configured to select a first address for a packet from the subset of available addresses representing the addressable entity associated with the packet when the packet contains a first type of data and a second address for the packet when the packet contains a second type of data.

18. The system of claim 16, wherein the at least one data conditioning process comprises Trellis coding, the second processing component comprising a Trellis encoder configured to selectively perform one of a Trellis initialization process and a training process on the first data stream according to the decoded second data stream.

19. The system of claim 16, the at least one data conditioning processing comprising Reed-Solomon encoding, and the second processing component comprising a Reed-Solomon encoder configured to selectively provide one of systematic Reed-Solomon encoding or non-systematic Reed-Solomon encoding to the according to the decoded second data stream.

20. The system of claim 16, further comprising a transmitter configured to transmit the first data stream.

* * * * *